A. D. Hibbs,
Inkstand.
No. 102,398.  Patented Apr. 26, 1870.
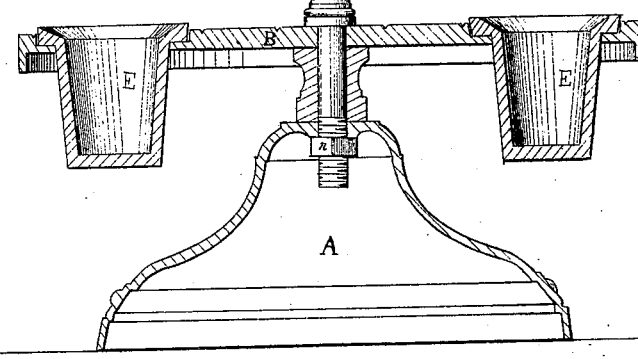
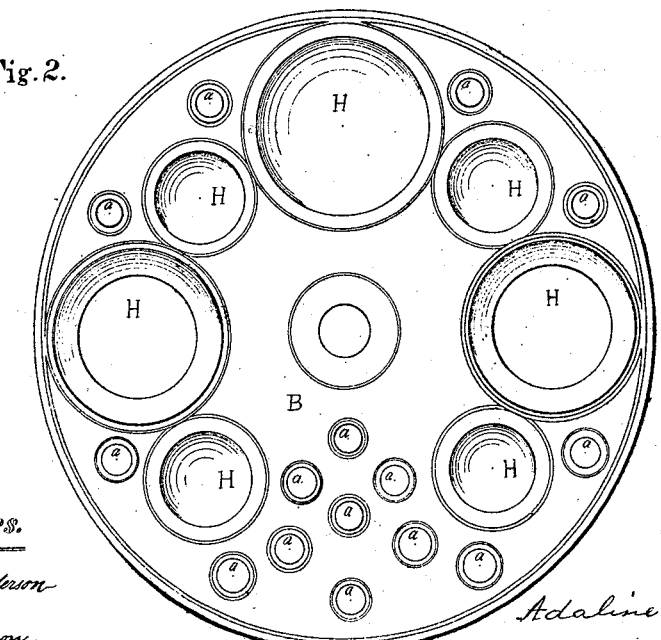
Witnesses.
Villett Anderson
Chas Kenyon.
Inventor.
Adaline D. Hibbs
Chipman, Hosmer & Co.
Atty

United States Patent Office.

ADALINE D. HIBBS, OF TRENTON, NEW JERSEY.

Letters Patent No. 102,398, dated April 26, 1870.

IMPROVEMENT IN STATIONERY FURNITURE.

The Schedule referred to in these Letters Patent and making part of the same

*To all whom it may concern:*

Be it known that I, ADALINE D. HIBBS, of Trenton, in the county of Mercer and State of New Jersey, have invented a new and useful Ink-Caster; and I do hereby declare that the following is a full, clear, and exact description of the same, reference being had to the accompanying drawings which form a part of these specifications.

My invention relates to devices for the use of clerks and professional men; and consists in the construction of an apparatus somewhat resembling a table-caster, but adapted for clerical use, by associating and arranging in a novel and convenient form a table-bell and a rotating disk, upon a pedestal in which said disk is arranged, a series of openings for holding pens, ink-stands, shot-cup, mucilage-bottle, and the like, together with removable cups which serve alternately as receptacles for sponge, rubber, strings, wafers, postage-stamps, and other small articles of stationery, and as covers for ink-stands, shot-cups, and other receptacles requiring such covers that appertain to the wants of clerks' desks.

Figure 1 of the drawings represents a sectional view of my caster, and

Figure 2, a plan view of the upper surface of the rotating disk.

Figure 3 is a detail showing one of the removable cups in section.

The letter A represents a pedestal;
B, the rotating disk;
C, the bell-standard; and
D, the bell; while
Letter E represents ink-stands, mucilage-bottles, or shot-cups in place.

The letter a represents small perforations through the disk, which are intended to hold pens in vertical positions.

The letter H represents removable cups arranged in the disk B, which are respectively adapted to serve as receptacles for small articles of stationery, such as rubber bands, sponge, wafers, postage-stamps, or sand, and also as covers for ink-stands, shot-cups, and other like devices, usually found upon the desks of clerks or professional men or merchants.

The standard C is affixed and made removable from the pedestal by means of the thread upon its lower end, and the nut $n$ connected therewith as shown.

The bell D is connected with and made removable from the standard by means of the thread $s$ on the lower end of its shank, working into a corresponding screw in the top of the standard.

I do not claim, broadly, a clerk's caster arranged with a revolving disk, for I am aware the discovery that such an article is desirable is not original with me, but, What I do claim as my invention, is—

The clerk's caster herein described, having rotating disk B, adjustable standard C, and bell D, the said disk being constructed with openings $a$, and having removable cups H, when all the parts are arranged substantially as and for the purposes specified.

In testimony whereof I have signed my name to this specification in the presence of two subscribing witnesses.

ADALINE D. HIBBS.

Witnesses:
D. T. PITTENGER,
FRANCIS SNOWDEN.